United States Patent
Henson et al.

(10) Patent No.: US 11,475,714 B2
(45) Date of Patent: Oct. 18, 2022

(54) SYSTEMS AND METHODS FOR DETECTING LIVENESS IN CAPTURED IMAGE DATA

(71) Applicant: Motorola Solutions, Inc., Chicago, IL (US)

(72) Inventors: Patrick Henson, Bedford, MA (US); Pietro Russo, Melrose, MA (US)

(73) Assignee: Motorola Solutions, Inc., Chicago, IL (US)

(*) Notice: Subject to any disclaimer, the term of this patent is extended or adjusted under 35 U.S.C. 154(b) by 7 days.

(21) Appl. No.: 16/794,556

(22) Filed: Feb. 19, 2020

(65) Prior Publication Data

US 2021/0256281 A1    Aug. 19, 2021

(51) Int. Cl.
*G06V 40/40*   (2022.01)
*G06N 3/08*    (2006.01)
*G06V 40/16*   (2022.01)

(52) U.S. Cl.
CPC ............. *G06V 40/45* (2022.01); *G06N 3/08* (2013.01); *G06V 40/161* (2022.01);
(Continued)

(58) Field of Classification Search
CPC .......... G06K 9/00906; G06K 9/00288; G06K 9/00228; G06N 3/08; G06T 2207/20224; G06T 2207/10048
See application file for complete search history.

(56) References Cited

U.S. PATENT DOCUMENTS

| 7,254,255 B2 | 8/2007 | Dennis |
| 10,043,086 B2 | 8/2018 | Zhou et al. |

(Continued)

FOREIGN PATENT DOCUMENTS

| CN | 111353326 A * | 6/2020 |
| EP | 2 927 841 A1 | 10/2015 |

OTHER PUBLICATIONS

J. Matias Di Martino et al., "Liveness Detection Using Implicit 3D Features", at <<https://arxiv.org/abs/1804.06702>>, pp. 1-21, Apr. 20, 2018.

*Primary Examiner* — Bobbak Safaipour
*Assistant Examiner* — Wassim Mahrouka
(74) *Attorney, Agent, or Firm* — Baker Botts L.L.P.; Michael A. Sartori

(57) ABSTRACT

Systems for detecting liveness in image data may perform a process including receiving, from one or more image capture devices, two-dimensional image data representing two images captured simultaneously and depicting the same human person, including data representing light captured in two spectral bands, such as visible light and infrared light. The received image data may be converted to grayscale or downsampled prior to further processing. The process may include creating a two-dimensional combined image representation of the received image data and analyzing the combined image representation to detect any implied three-dimensional features using a neural network or machine learning. The process may include classifying the received image data as likely to depict a live person or a two-dimensional spoof of a live person, dependent on the analysis, and outputting a classification result indicating a likelihood that the received image data depicts a live person.

14 Claims, 6 Drawing Sheets

(52) U.S. Cl.
CPC .. *G06V 40/172* (2022.01); *G06T 2207/10048* (2013.01); *G06T 2207/20224* (2013.01)

(56) References Cited

U.S. PATENT DOCUMENTS

| | | | | |
|---|---|---|---|---|
| 2005/0110610 | A1* | 5/2005 | Bazakos | G07B 15/04 340/5.82 |
| 2008/0219514 | A1 | 9/2008 | Detenuan et al. | |
| 2010/0303294 | A1* | 12/2010 | Zschau | G06F 3/013 382/103 |
| 2015/0278590 | A1* | 10/2015 | Gunjan | G06V 40/176 382/107 |
| 2015/0294136 | A1* | 10/2015 | Musial | G06V 10/42 382/118 |
| 2015/0324629 | A1* | 11/2015 | Kim | G06K 9/00268 382/203 |
| 2018/0211097 | A1* | 7/2018 | Wang | G06V 10/17 |
| 2019/0019027 | A1* | 1/2019 | Zhou | G06K 9/00604 |
| 2020/0143545 | A1* | 5/2020 | Weng | G05D 1/12 |

\* cited by examiner

SYSTEMS AND METHODS FOR DETECTING LIVENESS IN CAPTURED IMAGE DATA

BACKGROUND OF THE INVENTION

Authentication systems for controlling access to secure locations or restricted computing systems or other equipment may employ facial recognition technology to determine whether and when to grant access. However, many facial recognition implementations struggle to determine the difference between a live human face and a spoofed face. For example, it can be difficult for a facial recognition system to determine that a two-dimensional print of a live human person presented at the input to the system is not actually a live human person.

Existing solutions for liveness detection are computationally intense and often require input image data to be collected over a period of time, which introduces delays into the authentication system. For example, some existing liveness detection methods depend on receiving static images captured at multiple frame times or receiving multiple frames of a captured video stream. These methods may analyze multiple ones of the received images in an attempt to detect lip movements, blinking, breathing, or indications of a heartbeat reflected in subtle changes in skin tone over a period of several seconds, for example. However, these and other indications of liveness can be replicated in a video displayed on a mobile phone or tablet device and presented at the input to the system. Some liveness detection systems employ three-dimensional cameras to create a point cloud map of a person's face when they are in proximity to the access control system. However, these systems require extensive post-processing of the captured three-dimensional image, and considerable time, to accurately determine liveness.

BRIEF DESCRIPTION OF THE SEVERAL VIEWS OF THE DRAWINGS

In the accompanying figures, the same or similar reference numerals may be repeated to indicate corresponding or analogous elements. These figures, together with the detailed description below, are incorporated in and form part of the specification, and serve to further illustrate various embodiments of concepts that include the claimed invention, and to explain various principles and advantages of those embodiments.

Figure 1A:
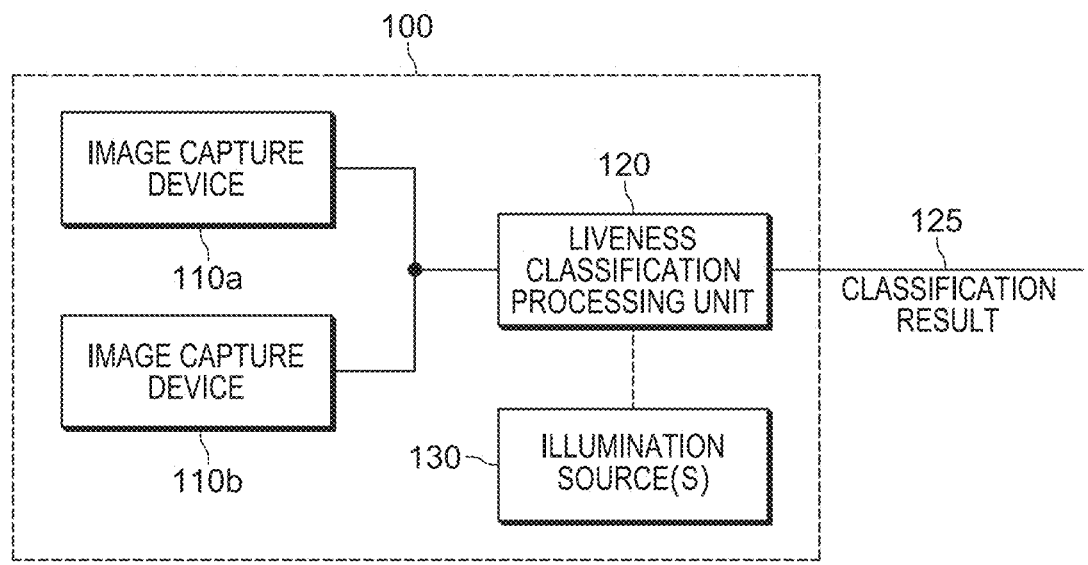
FIGS. 1A and 1B are block diagrams illustrating selected elements of a system for classifying received 2D image data as depicting a live human person or as depicting a spoof of a human person, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and process components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems and processes for detecting liveness in captured image data. In one embodiment, a disclosed process includes receiving, from one or more image capture devices, two-dimensional image data representing two images captured simultaneously and depicting a same human person, the data representing each image including data representing light captured in a respective one of two spectral bands, creating, based on the two-dimensional image data representing the two images, a two-dimensional combined image representation of the received two-dimensional image data, analyzing the two-dimensional combined image representation, the analyzing including determining whether implied three-dimensional features are detected in the two-dimensional combined image representation, classifying the received two-dimensional image data as likely to depict a live human person or as likely to depict a two-dimensional spoof of a live human person dependent on results of the analyzing, and outputting a classification result indicating a likelihood that the received two-dimensional image data depicts a live human person. In some embodiments, the process may further include processing data representing light captured by a single image capture device in the two spectral bands to generate the two-dimensional image data representing the two images.

In one embodiment, a disclosed system for detecting liveness in captured image data includes one or more image capture devices collectively configured to simultaneously capture two-dimensional image data representing two images and depicting a same human person, the data representing each image including data representing light captured in a respective one of two spectral bands, a processor, and a memory. The memory stores program instructions that when executed by the processor cause the processor to perform receiving, from the one or more image capture devices, the two-dimensional image data representing the two images, creating, based on the two-dimensional image data representing the two images, a two-dimensional combined image representation of the received two-dimensional image data, analyzing the two-dimensional combined image representation, the analyzing including determining whether implied three-dimensional features are detected in the two-dimensional combined image representation, classifying the received two-dimensional image data as likely to depict a live human person or as likely to depict a two-dimensional spoof of a live human person dependent on results of the analyzing, and outputting a classification result indicating a likelihood that the received two-dimensional image data depicts a live human person.

In some embodiments, the system may further include an infrared illumination source positioned to provide infrared illumination while the one or more image capture devices capture the two-dimensional image data representing the two images depicting the same human person. In some embodiments, when executed by the processor, the program instructions may further cause the processor to implement a neural network trained to detect liveness in two-dimensional image data depicting faces of human persons.

In one embodiment, a disclosed non-transitory, computer-readable storage medium has program instructions stored thereon that when executed by an electronic processor cause the electronic processor to perform receiving, from one or more image capture devices, two-dimensional image data representing two images captured simultaneously and depicting a same human person, the data representing each image including data representing light captured in a respective one of two spectral bands, creating, based on the two-dimensional image data representing the two images, a two-dimensional combined image representation of the received two-dimensional image data, analyzing the two-dimensional combined image representation, the analyzing including determining whether implied three-dimensional features are detected in the two-dimensional combined image representation, classifying the received two-dimensional image data as likely to depict a live human person or as likely to depict a two-dimensional spoof of a live human person dependent on results of the analyzing, and outputting a classification result indicating a likelihood that the received two-dimensional image data depicts a live human person.

In some embodiments, the data representing a first one of the two images may include data representing captured visible light and the data representing a second one of the two images includes data representing captured infrared light. In some embodiments, the data representing the two images may include data representing captured infrared light in two non-overlapping wavelength bands.

In some embodiments, the one or more image capture devices may include a single image capture device configured to capture light in the two spectral bands. In some embodiments, the one or more image capture devices may include two co-located and aligned image capture devices, each configured to capture light in a respective one of the two spectral bands.

In at least some embodiments, creating the two-dimensional combined image representation may include subtracting, on a per-pixel basis, data representing a first one of the two images from data representing a second one of the two images to generate data representing a two-dimensional intermediate image, and dividing, on a per-pixel basis, the data representing the two-dimensional intermediate image by the data representing the second one of the two images to create the two-dimensional combined image representation. In some embodiments, creating the two-dimensional combined image representation may further include, prior to the subtracting and the dividing, at least one of converting the data representing each of the two images to respective grayscale images, and down-sampling each of the respective grayscale images to a same two-dimensional resolution.

In at least some embodiments, analyzing the two-dimensional combined image representation may include, prior to determining whether implied three-dimensional features are detected in the two-dimensional combined image representation, performing a histogram equalization operation on data representing the two-dimensional combined image representation to increase contrast in the two-dimensional combined image representation. In some embodiments, analyzing the two-dimensional combined image representation and classifying the received two-dimensional image data may be performed using a neural network or machine learning model trained to detect liveness in two-dimensional image data depicting faces of human persons.

In various embodiments, the received two-dimensional image data may include data representing a static image depicting the human person or data representing a single frame of a video stream depicting the human person.

The systems and processes described herein for detecting liveness in captured image data may, in various embodiments, exhibit improved classification performance compared to existing liveness detection methods and may be performed in real time. When used in conjunction with facial recognition in authentication systems for access control, these systems and processes may be used to prevent a malicious actor from gaining access to a secure location or restricted computing system or other equipment using a two-dimensional spoof of a live human person, such as a two-dimensional video or a two-dimensional static image, whether presented as a digital image on a mobile phone or tablet device, for example, or as a printed image. In various embodiments, these systems may employ Artificial Intelligence (AI) and Machine Learning (ML) techniques, enabling performance improvements over expert feature analysis methods. For example, in some embodiments, a neural network may be trained to detect liveness in received two-dimensional image data more accurately, and more quickly, than when using existing liveness detection techniques.

In at least some embodiments, the systems and methods described herein may provide liveness detection using one or more image capture devices to capture multiple images depicting the same person in respective spectral bands. In various embodiments, each of the image capture devices may capture static images or frames of a video stream, in any combination. As described in more detail below, the captured images may be merged to create a combined image that passes or fails a liveness test when implied three-dimensional (3D) features, such as shadowing, are present or absent, respectively. In at least some embodiments, the liveness test may have better performance in terms of accuracy when applied to the combined image than when applied to image data representing light captured in a single spectral band.

In the liveness detection systems described herein, the captured images may be captured substantially simultaneously. For example, in embodiments in which two image devices are used, image capture operations may be initiated on both devices at the same time and the devices may be configured to capture images by collecting light with different spectral responses. The image capture operations may be performed concurrently, such as within a single frame time, although the capture operations on the two devices might not take exactly the same amount of time, allowing one to finish before the other. In some embodiments, a single image device may be used to capture multiple images depicting the same person in respective spectral bands. For example, a single image capture device may be configured to capture light across multiple spectral bands in a single image capture operation, after which the captured image data may be digitally processed to create multiple images representing light captured in respective spectral bands.

Figure 3:
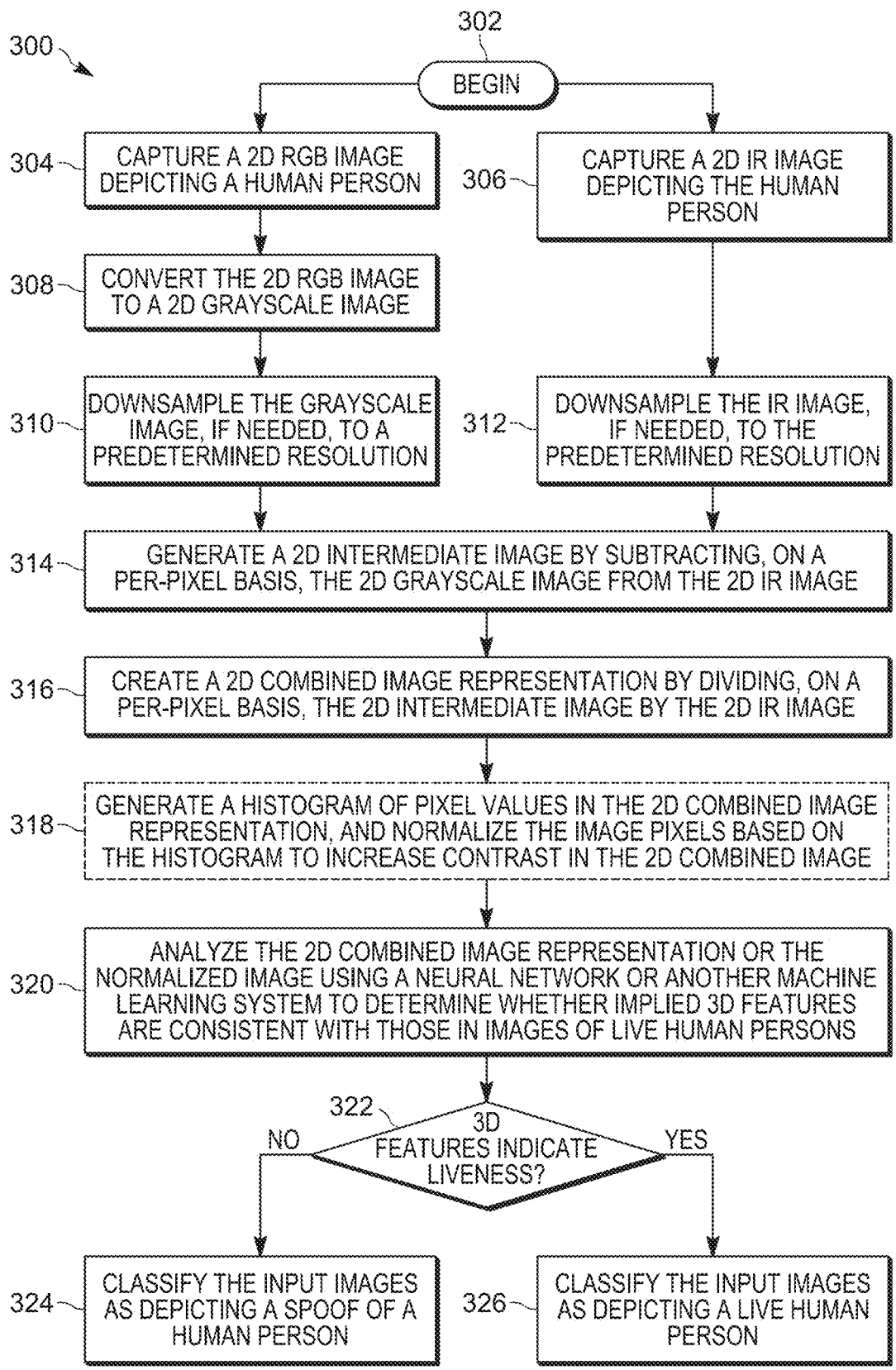
FIG. 3 is a flow diagram of selected elements of an example process for pre-processing RGB and IR image data depicting a human person and analyzing the pre-processed image data to detect liveness, in accordance with some embodiments.

In some embodiments, the captured image data may include data representing captured visible light and data representing captured infrared (IR) light. In some embodiments, the captured image data may include data representing captured infrared light in two non-overlapping wavelength bands. In general, the techniques described herein may be applied to captured image data representing captured light in any combination of non-overlapping wavelength bands. An example process for liveness detection in which visible light is captured using an RGB camera and infrared light is captured using an IR camera is illustrated in FIG. 3 and described below. However, the techniques described herein may be applied in liveness detection systems that include any combination of one or more still or video cameras that collectively detect light at two or more different spectral cutoffs.

Figure 1B:
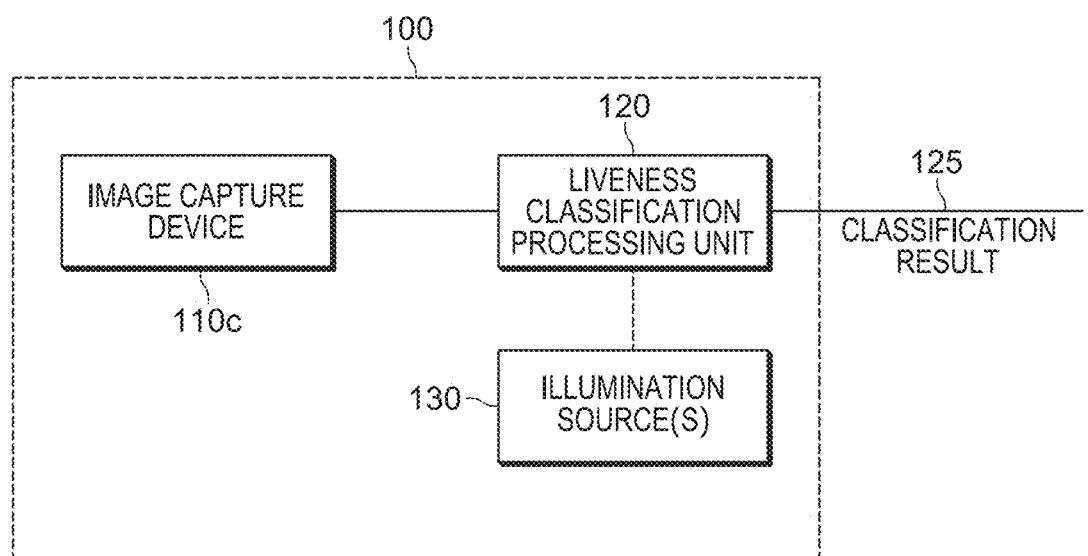

In at least some embodiments, utilizing one or more image capture devices that collectively capture light with different spectral cutoffs may enable the use of a non-visible external light source to illuminate the subject of the captured images. This may, in turn, make the liveness detection system relatively non-intrusive, compared to systems in which the light from a visible light source is constantly strobing to illuminate successive subjects, and configurable to accommodate varying site conditions. In addition, the flexibility of configuring the system to respond to different light spectrum may mitigate the issues many liveness detection systems have with non-optimal lighting conditions and non-optimal image capture angles. Example liveness detection systems in which the subject of the captured image data is illuminated using an external illumination source are illustrated in FIGS. 1A and 1B and described below.

Each of the above-mentioned embodiments will be discussed in more detail below, starting with example system and device architectures of the system in which the embodiments may be practiced, followed by an illustration of processing blocks for achieving an improved technical method, device, and system for detecting liveness in captured image data. Example embodiments are herein described with reference to flowchart illustrations and/or block diagrams of methods, systems, and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIGS. 1A and 1B are block diagrams illustrating selected elements of a system 100 for classifying received two-dimensional (2D) image data as depicting a live human person or as depicting a spoof of a human person, in accordance with some embodiments. The illustrated components of FIG. 1, along with other various modules and components, may be coupled to each other by or through one or more control or data buses that enable communication between them. The use of control and data buses for the interconnection between and exchange of information among the various modules and components would be apparent to a person skilled in the art in view of the description provided herein. In various embodiments, system 100 may be, or be a component of, an authentication system for access control that includes facial recognition technology to identify particular faces. In other embodiments, system 100 may be communicatively coupled to an authentication system for access control. In some embodiments, system 100 may be integrated with an electronic computing device or an electronic communications device, for example, desktop computer, a laptop computer, a tablet computer, a cellular telephone or other mobile communications device, and the like.

In the embodiment illustrated in FIG. 1A, system 100 includes two image capture devices, shown as image capture devices 110a and 110b, one or more illumination sources 130, and a liveness classification processing unit 120 configured to pre-process and analyze the image data received from the image captures devices 110 and to output a classification result 125 indicating the likelihood that the received two-dimensional image data depicts a live human person or indicating the likelihood that the received two-dimensional image data depicts a spoof of a live human person. In the illustrated embodiment, the classification result 125 may be provided to another element of the authentication system (not shown) where it may inform a decision about whether or not to grant access to a secure location or restricted computing system or other equipment. In FIGS. 1A and 1B, the illumination sources 130 are shown as external to the image capture devices 110. For example, in some embodiments, an illumination source 130 may be an IR spotlight positioned to capture a subject, such as a live human person or a spoofed representation of a live human person, that is presented at an authentication system. In embodiments in which an illumination source is external to the image capture devices 110, the illumination source may be enabled or otherwise controlled by liveness classification processing unit 120 to illuminate the subject during image capture operations. For example, liveness classification processing unit 120 may include one or more interfaces through which liveness classification processing unit 120 may be coupled to one or more illumination sources 130 to provide commands or control signals enabling illumination of the subjects of image capture operations. In other embodiments, a respective illumination source 130 may be built into any or all of the image capture devices 110.

In some embodiments, image data representing light captured in the visible (RGB) light portion of the electromagnetic spectrum, such as between 380 nm and 740 nm, and image data representing light captured in the infrared portion of the electromagnetic spectrum, such as between 700 nm and 1050 nm, may be captured by the one or more image capture devices 110. In other embodiments, image data representing light captured in two non-overlapping portions of the infrared spectrum may be captured by the one or more image capture devices 110. Many commonly used IR cameras operate at approximately 850 nm, while higher powered security cameras may operate at approximately 950 nm. In one example configuration, image data for a first image may include data representing light captured by a background camera shown as image capture device 110a that detects IR light spectrum with a cutoff of 700 nm to 850 nm. In this example, image data for a second image may include data representing light captured by an illuminated camera shown as image capture device 110b that detects IR light spectrum with a cutoff of 850 nm to 1050 nm and responds to illumination at 900 nm. In this example, illumination of the subject may be provided by an external 900 nm light source 130. In general, the techniques described herein for performing liveness detection using one or more image capture devices to capture multiple images depicting the same person in respective spectral bands may rely on one of the images being illuminated with light not visible or filtered from another one of the images, where the wavelengths of captured light represented in the two images are any wavelengths detectable by respective image sensors. This may include light captured in the visible portion of the electromagnetic spectrum, light captured in the infrared portion of the electromagnetic spectrum, and/or light captured in the near ultraviolet (UV) portion of the electromagnetic spectrum, such as between 380 nm and 740 nm.

In another example configuration, image data for a first image may include data representing light captured by a background camera shown as image capture device 110a that detects visible light spectrum and image data for a second image may include data representing light captured by an illuminated camera shown as image capture device 110b that detects IR light spectrum and responds to illumination at 850 nm plus or minus 10 nm. For example, a filter may be used to pass light within plus or minus 10 nm of the center value if 850 nm. In this example, illumination of the subject may be provided by an external 850 nm light source 130.

In at least some embodiments, a benefit of the liveness detection techniques described herein is that it might not be necessary for the RGB or IR image capture devices to be high resolution devices with expensive optics. While a typical RGB camera used in an authentication system for secure access may include high resolution large pixel size imagers with expensive varifocal lens, a low cost RGB or IR imager with an inexpensive lens may be sufficient for use in the liveness detection systems described herein.

Each of the image capture devices 110 may include various digital and analog components, which for brevity are not described herein and which may be implemented in hardware, software, or a combination of both. Each image capture device 110 may include one or more wired or wireless input/output (I/O) interfaces configurable to communicate with liveness classification processing unit 120. In at least some embodiments, each of the one or more image capture devices 110 may capture image data depicting a human person in at least one of two spectral bands and pass the image data to liveness classification processing unit 120 for pre-processing and an analysis with respect to liveness.

In the embodiment illustrated in FIG. 1B, system 100 includes a single image capture device 110c configured to capture image data representing light captured across multiple spectral bands in a single image capture operation. In the illustrated embodiment, liveness classification processing unit 120 may be configured to digitally process the captured image data to extract data representing two images in different spectral bands from the captured image data prior to further pre-processing and analysis by processing unit 120. Liveness classification processing unit 120 may be configured to perform a process to merge the two images in different spectral bands to create a combined image that accurately passes or fails a liveness test when implied three-dimensional (3D) features, such as shadowing, are present or absent, respectively.

Figure 5:
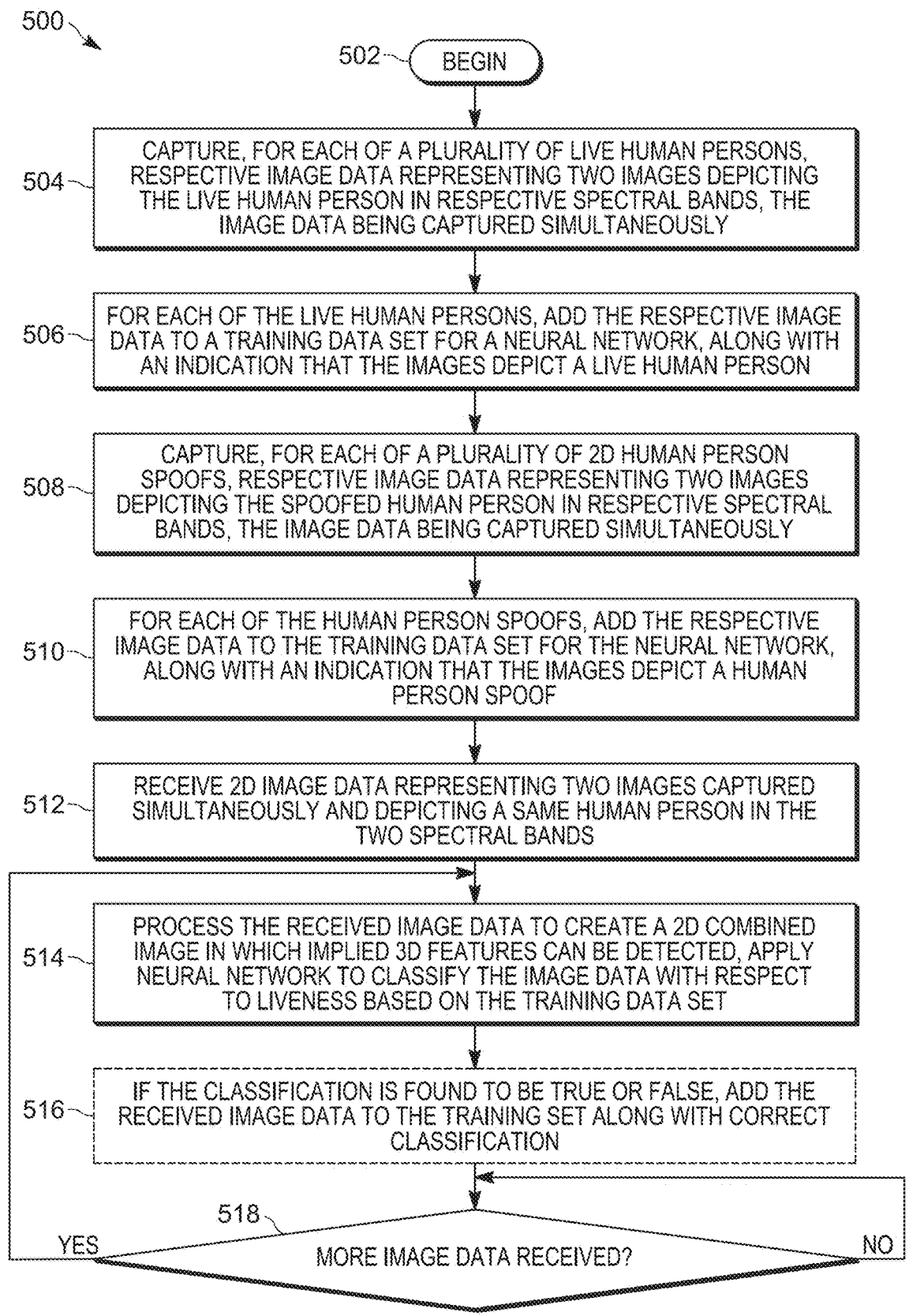
FIG. 5 is a flow diagram of selected elements of an example process for training and using a neural network for classifying received 2D image data as depicting a live human person or as depicting a spoof of a human person, in accordance with some embodiments.
Figure 6:
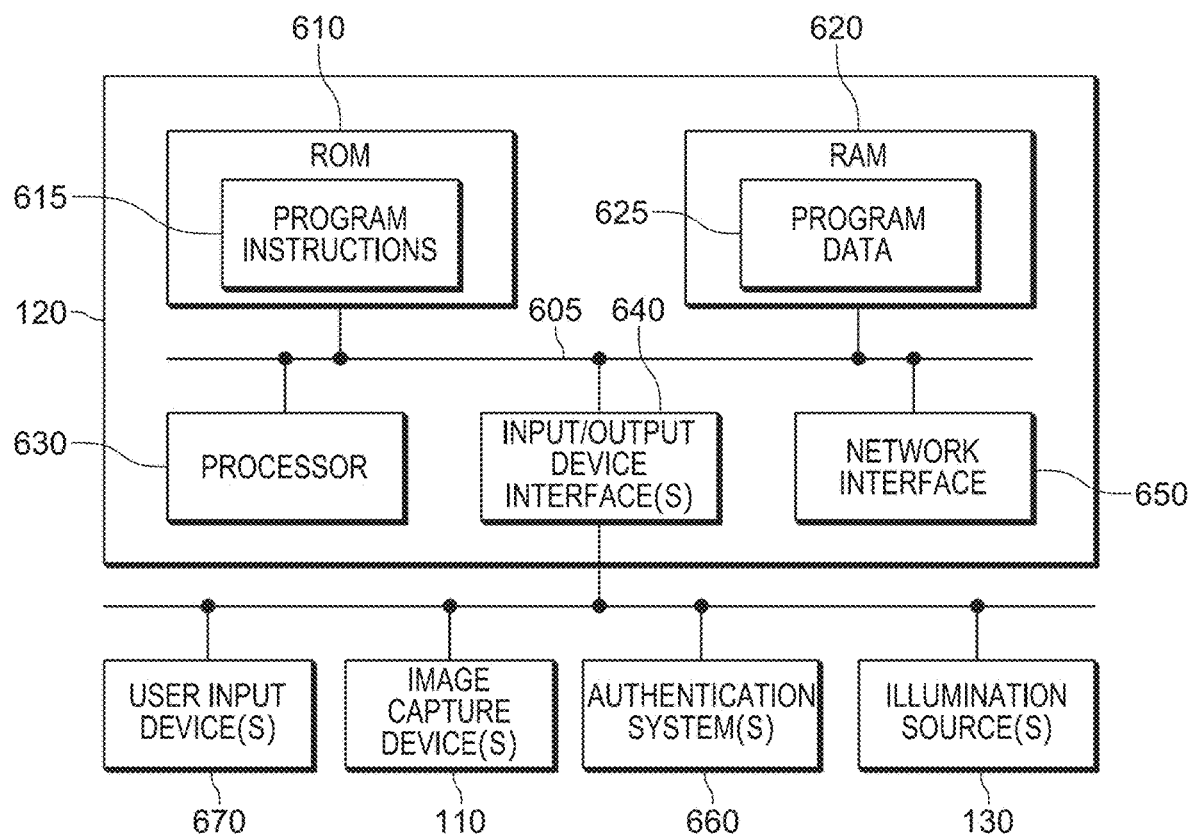
FIG. 6 is a block diagram illustrating selected elements of a liveness classification processing unit configured for classifying received 2D image data as depicting a live human person or as depicting a spoof of a human person and for training a neural network to perform such classifications, in accordance with some embodiments.

In at least some embodiments, liveness classification processing unit 120 may include a microprocessor configured to execute program instructions that implement a neural network trained for detecting liveness in captured image data. More specifically, the neural network may be trained for classifying received image data captured in two non-overlapping spectral bands as being likely to depict a live human person or as being likely to depict a two-dimensional spoof of a live human person. In some embodiments, the liveness classification processing unit 120 may include a graphics processing unit (GPU) or a vision processing unit or video processing unit, either of which may be referred to as a VPU, configured to perform certain aspects of a process for classifying received image data captured in two non-overlapping spectral bands as being likely to depict a live human person or as being likely to depict a two-dimensional spoof of a live human person or a process for training a neural network to perform such classifications. In some embodiments, other program instructions, when executed by the microprocessor, may perform training the neural network for classifying received image data captured in two non-overlapping spectral bands as being likely to depict a live human person or as being likely to depict a two-dimensional spoof of a live human person. Selected elements of an example liveness classification processing unit 120 are illustrated in FIG. 6 and described in more detail below. Selected elements of an example process for training and using a neural network for classifying received 2D image data as depicting a live human person or as depicting a spoof of a human person are illustrated in FIG. 5 and described in more detail below. In other embodiments, system 100 may include more, fewer, or different elements than those illustrated in FIGS. 1A and 1B.

Figure 2:
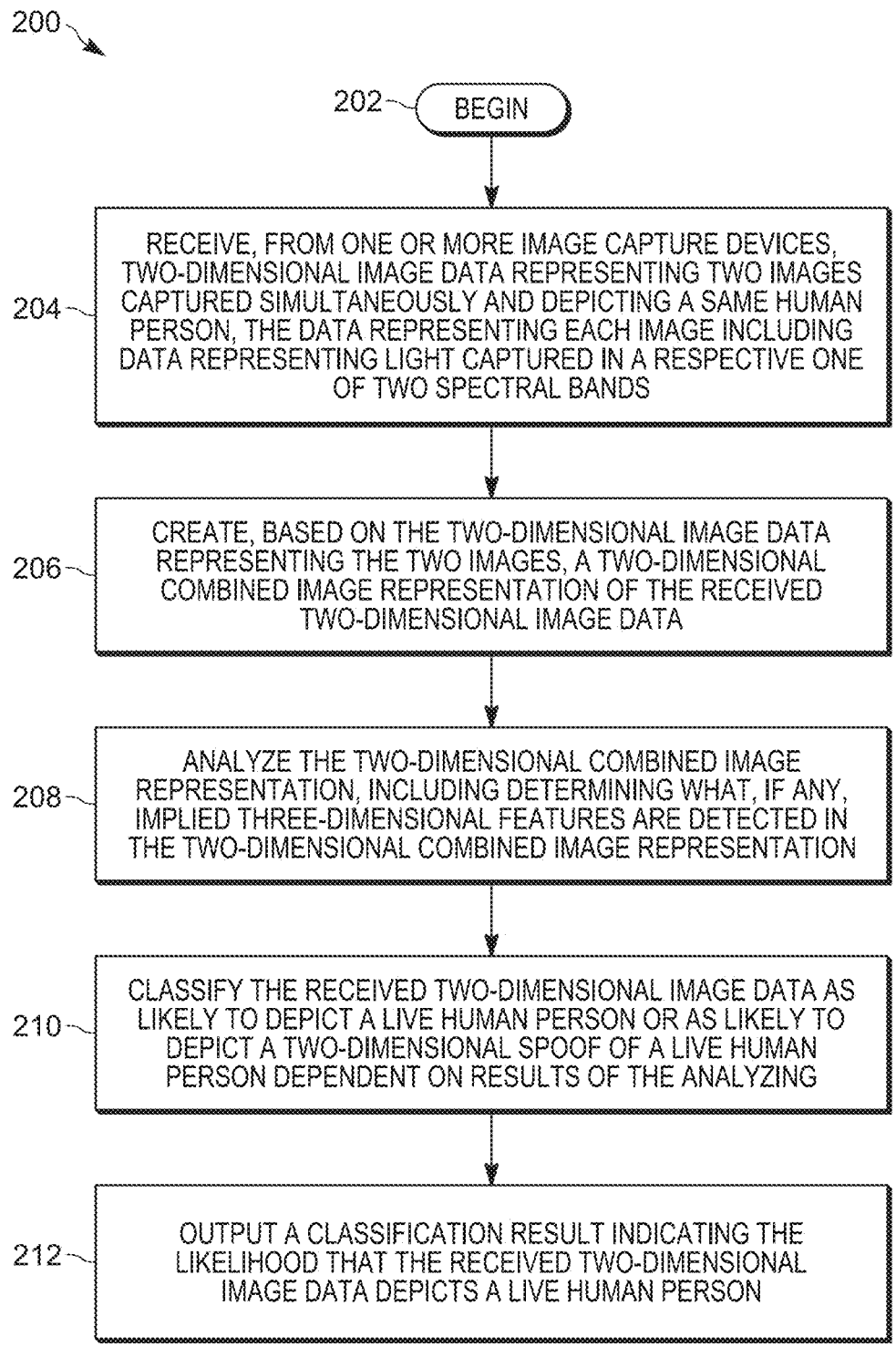
FIG. 2 is a flow diagram of selected elements of an example process for detecting liveness in captured 2D image data, in accordance with some embodiments.

Referring now to FIG. 2, there is provided a flow diagram of selected elements of an example process 200 for detecting liveness in captured 2D image data, in accordance with some embodiments. While a particular order of operations is indicated in FIG. 2 for illustrative purposes, the timing and ordering of such operations may vary where appropriate without negating the purpose and advantages of the examples set forth in detail throughout the remainder of this disclosure. In various embodiments, some or all of the operations of process 200 may be performed by a liveness classification processing unit, such as liveness classification processing unit 120 illustrated in FIGS. 1A, 1B, and 6.

In this example embodiment, process 200 begins with block 202 and continues with block 204, where two-dimensional image data representing two images captured simultaneously and depicting a same human person is received from one or more image capture devices. The data representing each image includes data representing light captured in a respective one of two spectral bands. The image data may be received from multiple image capture devices each of which responds to light in a different portion of the electromagnetic spectrum or from a single image capture device that responds to light across multiple spectral bands and, in some cases, extracts light captured in each of two spectral bands to generate two captured images. In some embodiments, an image capture operation may include recognizing a face in the subject presented to the image and cropping the captured image to include little more than the face. In some embodiments, an image capture operation may include illuminating the subject of the image capture operation, such as by enabling an IR illumination source built into the image capture device or by enabling an external IR illumination source.

At 206, process 200 includes creating, based on the two-dimensional image data representing the two images, a two-dimensional combined image representation of the received two-dimensional image data. In some embodiments, creating the two-dimensional combined image representation may include performing an image subtraction operation and an image division operation.

At 208, the process includes analyzing the two-dimensional combined image representation, including determining what, if any, implied 3D features are detected in the two-dimensional combined image representation. For example, if the received image data depicts a live human person, rather than a 2D spoof of a human person, it may be possible to detect shadows on the nose, the lips, or the eye sockets of a human face depicted in the two-dimensional combined image representation.

At 210, process 200 includes classifying the received two-dimensional image data as likely to depict a live human person or as likely to depict a two-dimensional spoof of a live human person dependent on results of the analyzing. For example, any implied 3D features that are detected may be compared with implied 3D features found in two-dimensional combined image representations in a training data set that are known to depict live human persons.

At 212, the process includes outputting a classification result indicating the likelihood that the received two-dimensional image data depicts a live human person. In some embodiments, the classification result may be provided to an authentication system for access control to inform a decision about whether and when to grant access to a secure location or restricted computing system or other equipment. For example, an authentication system for badge-less access to a secure location may include facial recognition technology to detect whether a face is presented to one or more image capture devices at a secure access point and to identify the person whose face is presented. In addition, a liveness detection system, such as system 100 illustrated in FIGS. 1A, 1B, and 6, may determine whether it is likely that the detected face is the face of a live human person standing at the secure access point. If the person identified by the facial recognition technology is authorized to enter the secure area, and if the liveness detection system determines that the detected face is likely to be the face of a live human person standing at the secure access point, access to the secure location may be granted automatically and in real time, such as in less than one second.

In at least some embodiments, some or all of the operations of process 200 illustrated in FIG. 2 may be repeated one or more times to classify subsequently received two-dimensional image data depicting human persons with respect to liveness. For example, in some embodiments, the operations may be performed automatically each time facial recognition technology detects that a face is presented to one or more image capture devices of a liveness detection system or each time the one or more image capture devices of a liveness detection system capture two-dimensional image data depicting the same human person.

Referring now to FIG. 3, there is provided a flow diagram of selected elements of an example process 300 for pre-processing RGB and IR image data depicting a human person and analyzing the pre-processed image data to detect liveness, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure. In various embodiments, some or all of the operations of process 300 may be performed by one or more image capture devices, such as the image capture devices 110 illustrated in FIGS. 1A, 1B, and 6, or a liveness classification processing unit, such as liveness classification processing unit 120 illustrated in FIGS. 1A, 1B, and 6.

In this example embodiment, process 300 begins with block 302 and continues with blocks 304 and 306, which are performed substantially simultaneously. In one example, a single command may trigger the performance of image capture operations by two image capture devices in respective spectral bands. In other embodiments, a single image capture device may perform an image capture operation in which the captured image data represents light captured across multiple spectral bands in response to a single command.

At 304, the process includes capturing, by an RGB image capture device, a 2D RGB image depicting a human person. In some embodiments, capturing the 2D RGB image may include detecting a human face and cropping the captured image to include little more than the detected human face. In some embodiments, capturing the 2D RGB image may include illuminating the subject of the image capture operation, such as by enabling an RGB illumination source built into the RGB image capture device or by enabling an external RGB illumination source.

At 306, process 300 includes capturing, by an IR image capture device, a 2D IR image depicting the human person. In some embodiments, capturing the 2D IR image may include detecting a human face and cropping the captured image to include little more than the detected human face. In some embodiments, capturing the 2D IR image may include illuminating the subject of the image capture operation, such as by enabling an IR illumination source built into the IR image capture device or by enabling an external IR illumination source.

At 308, the process includes converting the 2D RGB image to a 2D grayscale image. For example, the RGB camera or the liveness classification processing unit may convert the captured pixel values from values representing a range of colors to grayscale values.

At 310, process 300 includes downsampling the grayscale image, if needed, to a predetermined resolution. Similarly, at 312, the process includes downsampling the IR image, if needed, to the same predetermined resolution. For example, each of the captured images may have a resolution on the order of 1080 by 920 pixels. However, the liveness detection techniques described herein may not require such high resolution images to accurately detect liveness. In some embodiments, the images may be downsampled to a resolution of 120 by 120 pixels or even 60 by 60 pixels for real time processing performance while still meeting performance goals for accuracy. For example, the higher the resolution, the longer it takes to process, merge, and analyze the merged images with respect to liveness. In one example, downsampling to a resolution of 240 by 240 pixels significantly increased processing time compared to downsampling to a resolution of 120 by 120 pixels or 60 by 60 pixels with very little improvement in accuracy. In some embodiments, full resolution captured images in respective spectral bands may be used, if they have the same native resolution. While this could result in increased accuracy, the improvement might not be sufficient to justify the inability to perform liveness detection in real time.

At 314, process 300 includes generating a 2D intermediate image by subtracting, on a per-pixel basis, the 2D grayscale image from the 2D IR image At 316, the process includes creating a 2D combined image representation by dividing, on a per-pixel basis, the 2D intermediate image by the 2D IR image.

As illustrated at 318, in some embodiments, process 300 may include generating a histogram of pixels values in the 2D combined image representation and normalizing the image pixel values based on the histogram to increase contrast in the 2D combined image. In one example, the image pixel values may be sorted into ten bins, each representing a range of sequential pixel values that does not overlap with the range of sequential pixel values represented by any other one of the bins. Each bin may be assigned an average value for the pixels in the bin or another type of aggregate value for the pixels in the bin. The pixels values assigned to each bin may replace the pixel values in the 2D combined image to create a higher contrast version of the 2D combined image to which a liveness detection test is applied. In other embodiments, the number of bins into which pixel values of the 2D combined image representation are sorted may be less than or greater than ten. In some embodiments, the optimal number of bins may be determined during a training phase for the liveness detection system. In some embodiments, the liveness detection test may be applied to the 2D combined image representation without first generating a normalized version of the 2D combined image representation.

At 320, the process includes analyzing the 2D combined image representation or the normalized image, if generated, using a neural network or another machine learning system trained to detect liveness in two-dimensional image data depicting faces of human persons to determine whether implied 3D features are consistent with implied 3D features detected in images of live human persons that have been similarly pre-processed to create a 2D combine image representation.

If, at 322, it is determined that any implied 3D features do not indicate liveness, or that no implied 3D features are detected, process 300 continues to 324, where the process includes classifying the input images as depicting a 2D spoof of a human person. However, if, at 322, it is determined that implied 3D features do indicate liveness, process 300 proceeds to 326, where the process includes classifying the input images as depicting a live human person. As described above in reference to FIGS. 1A, 1B, and 2, in some embodiments the classification result may be output by a liveness classification processing unit and provided to an authentication system for secure access to inform a decision about whether or when to grant access to a secure location or a restricted computing system or other equipment.

In at least some embodiments, the techniques described herein for detecting liveness in captured image data may be applied in systems that implement liveness detection using unsupervised machine learning. In other embodiments, these techniques may be applied in liveness detection systems that employ supervised machine learning or other artificial intelligence techniques. For example, unsupervised liveness detection techniques may operate under an assumption that the majority of instances of a detected face in an unlabeled data set should not be classified as depicting spoofed faces and may classify as spoofed faces those instances that appear to be outliers compared to the majority of detected faces. Supervised liveness detection techniques typically involve training a classifier, which may involve labeling elements of a training data set as representing a spoofed face or as representing a live human face. Machine learning techniques that may be used in the liveness detection systems described herein may include, but are not limited to, Linear Regression techniques, Logistic Regression techniques, Decision Trees, SVM, Naive Bayes techniques, k-nearest neighbor techniques, K-Means clustering, Random Decision Forest techniques, Dimensionality Reduction Algorithms, various Gradient Boosting algorithms, such as Gradient Boosting Machine techniques, Extreme Gradient Boosting algorithms, Light Gradient Boosting Machine algorithms, or Gradient Boosting algorithms with categorical features, Apriori algorithms, Markov Decision Processes, and various neural networks, such Feedforward Neural Networks, Artificial Neuron Models, Radial Basis Function Neural Networks, Multilayer Perceptron networks, Convolutional Neural Networks, Deep Convolutional Neural Networks, Deconvolutional Neural Networks, Deep Convolutional Inverse Graphics Networks, Generative Adversarial Networks, Recurrent Neural Networks, Long/Short Term Memory techniques, Modular Neural Networks, Sequence-To-Sequence Models, Liquid State Machines, Extreme Learning Machines, Deep Residual Networks, Kohonen Networks, Support Vector Machines, or Neural Turing Machines.

Figure 4A:
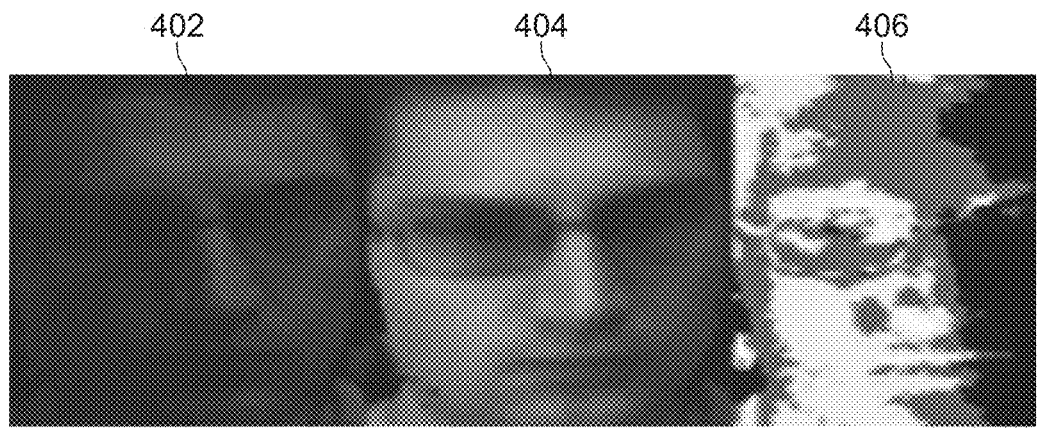
FIG. 4A illustrates successive results of pre-processing operations on captured 2D image data representing a live human person, in accordance with some embodiments.

FIG. 4A illustrates successive results of pre-processing operations performed on captured 2D image data representing a live human person, in accordance with some embodiments. More specifically, image 402 represents a grayscale image created from a captured RGB image of the live human person's face, image 404 represents an illuminated IR image of the live human person's, as captured, and image 406 represents a 2D combined image created using the per-pixel image subtraction and division operations described herein. As shown in FIG. 4A, a number of implied 3D structures are detectable in image 406 following these pre-processing operations, including shadows on the nose, the lips, and the eye sockets of the live human face. In some embodiments, a neural network or another machine learning system trained to detect liveness in two-dimensional image data depicting faces of human persons may process image 406 and determine that the implied 3D features are consistent with implied 3D features detected in images of live human persons that have been similarly pre-processed to create a 2D combine image representation.

Figure 4B:
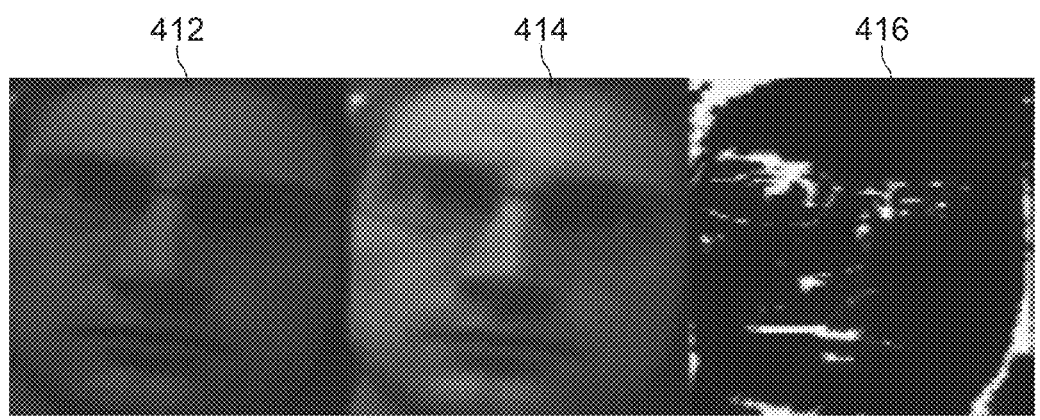
FIG. 4B illustrates successive results of pre-processing operations on captured 2D image data representing a spoof of a live human person, in accordance with some embodiments.

FIG. 4B illustrates successive results of pre-processing operations performed on captured 2D image data representing a spoof of a live human person, in accordance with some embodiments. In this example, the 2D spoof is a printed photograph held flat and depicting a human face tilted at an angle that presents the most facial detail toward the image capture devices of the liveness detection system. In this example, image 412 represents a grayscale image created from a captured RGB image of the photograph, image 414 represents an illuminated IR image of the photograph, as captured, and image 416 represents a 2D combined image created using the per-pixel image subtraction and division operations described herein. As shown in FIG. 4B, very few implied 3D structures are detectable in image 416 following these pre-processing operations. In some embodiments, a neural network or another machine learning system trained to detect liveness in two-dimensional image data depicting faces of human persons may process image 416 and determine that these implied 3D features are not consistent with implied 3D features detected in images of live human persons that have been similarly pre-processed to create a 2D combine image representation. Similar results were obtained when analyzing captured images in multiple spectral bands of a photograph depicting a human face and held in curved position in an attempt to spoof a 3D depiction of a human person and when analyzing captured images in multiple spectral bands of mobile a phone screen displaying a digital image of a human person. Using the disclosed liveness detection techniques, any implied 3D structures may be detectable in the 2D combined image representations described herein even when the captured 2D image data from which they are generated is low resolution image data.

Referring now to FIG. 5, there is provided a flow diagram of selected elements of an example process 500 for training and using a neural network for classifying received 2D image data as depicting a live human person or as depicting a spoof of a human person, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure. In various embodiments, some or all of the operations of process 500 may be performed by one or more image capture devices, such as image capture devices 110 illustrated in FIGS. 1A, 1B, and 6, or a liveness classification processing unit, such as liveness classification processing unit 120 illustrated in FIGS. 1A, 1B, and 6.

In this example embodiment, process 500 begins with block 502 and continues with block 504, with capturing, for each of a plurality of live human persons, respective image data representing two images depicting the live human person in respective spectral bands, the image data being captured substantially simultaneously. In one example embodiment, a single command may trigger the performance of image capture operations by two image capture devices in respective spectral bands. In other embodiments, a single image capture device may perform an image capture operation in which the captured image data represents light captured across multiple spectral bands in response to a single command. In some embodiments, capturing each image may include detecting a human face and cropping the captured image to include little more than the detected human face. In some embodiments, capturing each image may include illuminating the subject of the image capture operation, such as by enabling an illumination source built into an image capture device or by enabling an external illumination source.

At 506, process 500 includes, for each of the live human persons, adding the respective image data to a training data set for a neural network, along with an indication that the images depict a live human person.

At 508, the process includes capturing, for each of a plurality of 2D human person spoofs, respective image data representing two images depicting the spoofed human person in respective spectral bands, the image data being captured substantially simultaneously. In one example embodiment, a single command may trigger the performance of image capture operations by two image capture devices in respective spectral bands. In other embodiments, a single image capture device may perform an image capture operation in which the captured image data represents light captured across multiple spectral bands in response to a single command. In some embodiments, capturing each image may include detecting what appears to be a human face and cropping the captured image to include little more than the detected human face. In some embodiments, capturing each image may include illuminating the subject of the image capture operation, such as by enabling an illumination source built into an image capture device or by enabling an external illumination source.

At 510, process 500 includes, for each of the human person spoofs, adding the respective image data to the training data set for the neural network, along with an indication that the images depict a 2D spoof of a human person.

At 512, the process includes receiving, at a liveness classification processing unit or another processing unit configured to perform image processing, the 2D image data representing the two images captured simultaneously and depicting a same human person in the two spectral bands.

At 514, process 500 includes processing the received image data to create a 2D combined image in which implied 3D features can be detected and applying a neural network to classify the image data with respect to liveness based on the training data set. For example, a liveness classification processing unit may analyze the 2D combined image representation, or a normalized version thereof, if generated, using a neural network or another machine learning system trained to detect liveness in two-dimensional image data depicting faces of human persons to determine whether any implied 3D features detected in the 2D combined image representation, or a normalized version thereof, are consistent with implied 3D features detected in images of live human persons that have been similarly pre-processed to create a 2D combine image representation.

As illustrated at 516, in some embodiments the process includes, if the classification is subsequently confirmed as being true or determined to be false, adding the received image data to the training set along with a correct classification for the received image data. For example, if the received two-dimensional image data was classified as likely to depict a live human person, it may subsequently be confirmed to depict a live human person or may be found to depict a 2D spoof of a human person, in which case its initial classification may be corrected. Conversely, if the received two-dimensional image data was classified as likely to depict a 2D spoof of a live human person, it may subsequently be confirmed to depict a 2D spoof of a live human person or may be found to depict a live human person, in which case its initial classification may be corrected. In various embodiments, the confirmation or correction of classification results might not be performed in real time. For example, the confirmation or correction of classification results may be performed during an audit of the liveness detection system performance or in response to receiving feedback indicating that particular classification results have been confirmed as true or determined to be false.

If and when, at 518, more image data captured in multiple spectral bands and depicting the same human person is received, process 500 may return to 514, after which the operations shown as 514 and 516 may be performed to classify the received image data, as appropriate, each time such additional image data is received. In at least some embodiments, some or all of the operations of process 500 illustrated in FIG. 5 may be repeated one or more times to train, retrain, or improve the liveness classification performance of the neural network as additional training data becomes available or in response to determining that the liveness classification performance does not yet meet a desired performance target.

The accuracy performance of the techniques described herein for classifying received 2D image data as depicting a live human person or as depicting a spoof of a human person has been evaluated through various experiments. Through these experiments, five other liveness detection methods that were trained using 80,000 training data samples were found to achieve between 70% and 90% accuracy. By contrast, when a neural network implementing the disclosed liveness detection techniques was trained using as few as 1,200 training data samples, these techniques were found to be 92% accurate. Through these experiments, the neural network implementing the disclosed liveness detection techniques was trained across images, captured in multiple spectral bands, of a range of live human faces and 2D spoofs of human faces that were printed on paper or displayed on tablet devices, mobile phones, and laptops screens while the subjects of the captured images were illuminated straight on and from a variety of different directions and angles. The images themselves were captured straight on or from other directions, such as from the left and right sides, with the cameras or the subjects tilted at different angles, such as up, down, to the left, and to the right. The captured images were cropped to include just the faces and the resulting cropped images were merged as described herein and used to train the liveness classification processing unit to recognize the differences between the images of live human faces and the images of 2D spoofs of human faces.

FIG. 6 is a block diagram illustrating selected elements of a liveness classification processing unit 120 configured for classifying received 2D image data as depicting a live human person or as depicting a spoof of a human person and for training a neural network to perform such classifications, in accordance with some embodiments. In some embodiments, liveness classification processing unit 120 may be similar to liveness classification processing unit 120 illustrated in FIGS. 1A and 1B. In the illustrated example, liveness classification processing unit 120 includes a Read Only Memory (ROM) 610, a Random Access Memory (RAM) 620, an electronic processor 630, one or more input/output device interfaces 640 for communicating with locally attached devices and components, and a network interface 650 for communicating with a remote server or device (not shown in FIG. 6), all of which are coupled to a system bus 605 through which they communicate with each other. In various embodiments, the electronic processor 630 may include a microprocessor, a graphics processing unit, a microcontroller, a system-on-chip, a field-programmable gate array, a programmable mixed-signal array, or, in general, any system or sub-system that includes nominal memory and that is capable of executing a sequence of instructions in order to control hardware.

In the illustrated embodiment, ROM 610 stores program instructions 615, at least some of which may be executed by the electronic processor 630 to perform some or all of the processes described herein. Liveness classification processing unit 120 may thus be configured to receive and pre-process 2D image data captured simultaneously in multiple spectral bands, to implement a neural network or another machine learning system for classifying received 2D image data captured in two non-overlapping spectral bands as being likely to depict a live human person or as being likely to depict a two-dimensional spoof of a live human person or to train a neural network to perform such classifications. For example, liveness classification processing unit 120 may be configured to implement a pre-processing operation to convert a captured RGB image to grayscale, to downsample images simultaneously captured in multiple spectral bands to the same resolution, or to create a 2D combined image representation of the captured images for input to the neural network or other machine learning system. In other embodiments, at least some of the pre-processing operations described herein, such an operation to convert a captured RGB image to grayscale or an operation to detect a face in captured image data and crop the captured image data to include only the detected face, may be performed by a processing unit on the image capture devices themselves.

In various embodiments, at least some of the operations of process 200 illustrated in FIG. 2, process 300 illustrated in FIG. 3, and process 500 illustrated in FIG. 5 may be performed by program instructions 615 executing on electronic processor 630 of liveness classification processing unit 120. For example, program instructions 615 may, when executed by electronic processor 630, cause the liveness classification processing unit to receive, from one or more image capture devices 110 via an input/output device interface 640, two-dimensional image data representing two images captured simultaneously and depicting the same human person, including data representing light captured in two spectral bands, convert captured image data to grayscale or downsampling captured image data prior to further processing, create a two-dimensional combined image representation of the received image data, analyze the combined image representation to detect any implied three-dimensional features using a neural network or machine learning, classify the received image data as likely to depict a live person or a two-dimensional spoof of a live person, dependent on the analysis, and output a classification result indicating a likelihood that the received image data depicts a live person.

In some embodiments, program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 615 may include program instructions that when executed by electronic processor 630 implement other functionality features of an authentication system for access control. For example, in some embodiments, program instructions 615 may, when executed by electronic processor 630, be operable to perform facial recognition operations to detect human faces or to identify particular human faces in the image data received by image capture devices 110.

In this example embodiment, RAM 620 may, from time to time, store program data 625 including, without limitation, received or pre-processed image data in multiple spectral bands, 2D combined image representations, or initial or corrected classification results associated with received, pre-processed, or combined image data. In some embodiments, RAM 620 may also store data used in performing other functions of the liveness classification processing unit 120. In some embodiments, RAM 620 may, from time to time, store local copies of all or a portion of program instructions 615 or other program instructions copied from ROM 610 or received over network interface 650.

In this example embodiment, input/output device interfaces 640 may include one or more analog input interfaces, such as one or more analog-to-digital (A/D) convertors, or digital interfaces for receiving signals or data from, and sending signals or data to, one or more input/output devices. In various embodiments, input/output device interfaces 640 may operate to receive user input, to provide system output, or a combination of both. For example, in some embodiments, input/output device interfaces 640 may include one or more output interfaces for providing commands or control signals to one or more image capture devices 110 to initiate simultaneous image capture operations in multiple spectral bands and one or more input interfaces for receiving image data from the image capture devices 110. In some embodiments, input/output device interfaces 640 may include one or more external memory interfaces through which liveness classification processing unit 120 may be coupled to an external memory (not shown in FIG. 6). Such an external memory may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, or at certain times, some or all of program data 625 may reside in external memory rather than, or in addition to, within RAM 620. In some embodiments, input/output device interfaces 640 may include one or more interfaces through which liveness classification processing unit 120 may be coupled to one or more illumination sources 130 to provide commands or control signals enabling illumination of the subjects of image capture operations.

In the illustrated embodiment, one or more user input/output devices 670 may be used to provide user input to liveness classification processing unit 120 via input/output device interfaces 640 or to display a classification result to a user. In various embodiments, a user input/output device 670 may include any of a variety of suitable mechanisms for receiving user input, such as for initializing and initiating a liveness classification exercise or for initializing and initiating an exercise to train a neural network for classification of received 2D image data with respect to liveness, as described herein such as, for example, a keyboard or keypad, a microphone, soft keys, icons, or soft buttons on a touch screen of a display, a scroll ball, a mouse, buttons, and the like. Input/output device interfaces 640 may also include other input mechanisms, which for brevity are not described herein and which may be implemented in hardware, software, or a combination of both. In some embodiments, input/output device interfaces 640 may include a graphical user interface (GUI) generated, for example, by electronic processor 630 from program instructions 615 and program data 625 and presented on a display, enabling a user to interact with the display. In various embodiments, a user input/output device 670 may include any suitable display technology for presenting information to a user including, for example, a classification result.

As illustrated in FIG. 6, input/output device interfaces 640 may operate to receive image data from one or more image capture devices 110. In some embodiments, input/output device interfaces 640 may operate to provide classification results to one or more authentication systems 660, such as any of a variety of secure access systems, or to receive confirmation of classification results from one or more authentication systems 660. In some embodiments, input/output device interfaces 640 may operate to provide data or control signals to one or more illumination sources 130, such as to enable IR illumination while IR images are captured by one or more image capture devices 110.

Network interface 650 may be a suitable system, apparatus, or device operable to serve as an interface between electronic processor 630 and a network. Network interface 650 may enable liveness classification processing unit 120 to communicate over a network using a suitable transmission protocol or standard, including, but not limited to, transmission protocols and standards enumerated below with respect to the discussion of the network. In some embodiments, network interface 650 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages, which are generally referred to as data. The network may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network and its various components may be implemented using hardware, software, or any combination thereof. Network interface 650 may enable wired or wireless communications to and from liveness classification processing unit 120 and other elements of an authentication system for access control. In some embodiments, image data may also or alternatively be received over network interface 650 rather than via one of the input/output device interfaces 640.

The systems and processes described herein for classifying received 2D image data captured in two non-overlapping spectral bands as being likely to depict a live human person or as being likely to depict a two-dimensional spoof of a live human person may provide technical benefits over conventional techniques for classifying 2D image data with respect to liveness. For example, the liveness detection techniques described herein rely on images captured simultaneously, such as within a single frame time, rather than across multiple frames. Capturing data representing two images in respective spectral bands simultaneously may allow liveness detection operations to be performed using real time processing of the image data with a classification accuracy that is higher than in many existing systems. In some embodiments, classification results with respect to liveness may be provided to an authentication system to inform an access control decision less than one second after the two images are captured. The systems described herein may utilize multiple image capture devices that capture light in different spectral bands or a single image capture device that can capture light in multiple spectral bands digitally processing the captured image data to create the two images. For example, an image capture device may include a single digital chip that captures light in multiple spectral bands simultaneously.

Capturing input images simultaneously, rather than collecting sequential frames, may result in the captured images being better aligned, may reduce delays in the availability of image data for processing and analysis, and may improve the overall response time of an authentication system that relies on the classification results. In addition, the use of spectral cutoff may allow the system configuration to be modified to optimize performance based upon the environment and context in which the system is used. In embodiments in which IR illumination is used, human persons that are the subjects of image capture operations are not subjected to bright flashes or strobes of visible light.

As should be apparent from this detailed description, the operations and functions of the liveness classification processing unit are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations. For example, a human mind cannot interface directly with RAM or other digital storage, cannot transmit or receive electronic messages, electronically encoded video, electronically encoded still images, and the like, and cannot create the 2D combined image representations described herein nor analyze them with respect to liveness, among other features and functions set forth herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context. A device or structure that is "configured" in a certain way is configured in at least that way, but may also be configured in ways that are not listed.

It will be appreciated that some embodiments may be comprised of one or more generic or specialized processors, or "processing devices", such as microprocessors, GPUs, VPUs, digital signal processors, customized processors and field programmable gate arrays (FPGAs) and unique stored program instructions, including both software and firmware, that control the one or more processors to implement, in conjunction with certain non-processor circuits, some, most, or all of the functions of the processes or systems described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory computer-readable storage medium having computer readable code stored thereon for programming a computer including for example, a processor, to perform a process as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Further, it is expected that one of ordinary skill, notwithstanding possibly significant effort and many design choices motivated by, for example, available time, current technology, and economic considerations, when guided by the concepts and principles disclosed herein will be readily capable of generating software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for detecting liveness in captured image data, the method comprising:
   receiving, from one or more image capture devices, two-dimensional image data representing two static images captured simultaneously and depicting a same human person, the two-dimensional image data representing each of the two static images including data representing light captured in a respective one of two spectral bands, wherein the two-dimensional image data representing a first one of the two static images includes data representing captured visible light and the two-dimensional image data representing a second one of the two static images includes data representing captured infrared light;
   creating, based on the two-dimensional image data representing the two static images, a two-dimensional combined image representation of the received two-dimensional image data;
   analyzing the two-dimensional combined image representation, the analyzing including determining whether shadowing is detected in the two-dimensional combined image representation;
   classifying the received two-dimensional image data as likely to depict a live human person or as likely to depict a two-dimensional spoof of a live human person dependent on results of the analyzing; and
   outputting a classification result indicating a likelihood that the received two-dimensional image data depicts a live human person;
   wherein the creating of the two-dimensional combined image representation of the received two-dimensional image data comprises:
      subtracting, on a per-pixel basis, the two-dimensional image data representing the first one of the two static images from the two-dimensional image data representing the second one of the two static images to generate two-dimensional image data representing an intermediate image; and
      dividing, on a per-pixel basis, the two-dimensional image data representing the intermediate image by the two-dimensional image data representing the second one of the two static images to create the two-dimensional combined image representation of the received two-dimensional image data.

2. The method of claim 1, wherein:
   the one or more image capture devices comprises a single image capture device configured to capture light in the two spectral bands; and
   the method further comprises processing data representing light captured by the single image capture device in the two spectral bands to generate the two-dimensional image data representing the two static images.

3. The method of claim 1, wherein the one or more image capture devices comprises two co-located and aligned image capture devices, each configured to capture light in a respective one of the two spectral bands.

4. The method of claim 1, wherein creating the two-dimensional combined image representation further comprises, prior to said subtracting and said dividing, at least one of: converting the two-dimensional image data representing each of the two static images to respective grayscale images; and down-sampling each of the respective grayscale images to a same two-dimensional resolution.

5. The method of claim 1, wherein analyzing the two-dimensional combined image representation comprises, prior to determining whether shadowing is detected in the two-dimensional combined image representation, performing a histogram equalization operation on data representing the two-dimensional combined image representation to increase contrast in the two-dimensional combined image representation.

6. The method of claim 1, wherein creating the two-dimensional combined image representation further comprises, prior to said subtracting and said dividing, at least one of: converting the two-dimensional image data representing each of the two static images to respective grayscale images; and down-sampling each of the respective grayscale images to a same two-dimensional resolution.

7. A system for detecting liveness in captured image data, the system comprising:
   one or more image capture devices collectively configured to simultaneously capture two-dimensional image data representing two static images and depicting a same human person, the two-dimensional image data representing each of the two static images including data representing light captured in a respective one of two spectral bands, wherein the two-dimensional image data representing a first one of the two static images includes data representing captured visible light and the two-dimensional image data representing a second one of the two static images includes data representing captured infrared light;
   a processor; and
   a memory storing program instructions that when executed by the processor cause the processor to perform:
      receiving, from the one or more image capture devices, the two-dimensional image data representing the two static images;
      creating, based on the two-dimensional image data representing the two static images, a two-dimensional combined image representation of the received two-dimensional image data;
      analyzing the two-dimensional combined image representation, the analyzing including determining whether shadowing is detected in the two-dimensional combined image representation;

classifying the received two-dimensional image data as likely to depict a live human person or as likely to depict a two-dimensional spoof of a live human person dependent on results of the analyzing; and outputting a classification result indicating a likelihood that the received two-dimensional image data depicts a live human person;

wherein the creating of the two-dimensional combined image representation comprises:
  subtracting, on a per-pixel basis, the two-dimensional image data representing the first one of the two static images from the two-dimensional image data representing the second one of the two static images to generate two-dimensional image data representing an intermediate image; and
  dividing, on a per-pixel basis, the two-dimensional image data representing the intermediate image by the two-dimensional image data representing the second one of the two static images to create the two-dimensional combined image representation of the received two-dimensional image data.

8. The system of claim 7, further comprising an infrared illumination source positioned to provide infrared illumination while the one or more image capture devices capture the two-dimensional image data representing the two static images depicting the same human person.

9. The system of claim 7, wherein:
  the one or more image capture devices comprises a single image capture device configured to capture light in the two spectral bands; and
  when executed by the processor, the program instructions further cause the processor to perform processing data representing light captured by the single image capture device in the two spectral bands to generate the two-dimensional image data representing the two static images.

10. The system of claim 7, wherein the one or more image capture devices comprises two co-located and aligned image capture devices, each configured to capture light in a respective one of the two spectral bands.

11. The system of claim 7, wherein:
  when executed by the processor, the program instructions further cause the processor to implement a neural network trained to detect liveness in two-dimensional image data depicting faces of human persons; and
  said analyzing the two-dimensional combined image representation and said classifying the received two-dimensional image data are performed using the neural network.

12. A non-transitory, computer-readable storage medium having program instructions stored thereon that when executed by an electronic processor cause the electronic processor to perform:
  receiving, from one or more image capture devices, two-dimensional image data representing two static images captured simultaneously and depicting a same human person, the two-dimensional image data representing each of the two static images including data representing light captured in a respective one of two spectral bands, wherein the two-dimensional image data representing a first one of the two static images includes data representing captured visible light and the two-dimensional image data representing a second one of the two static images includes data representing captured infrared light;
  creating, based on the two-dimensional image data representing the two static images, a two-dimensional combined image representation of the received two-dimensional image data;
  analyzing the two-dimensional combined image representation, the analyzing including determining whether shadowing is detected in the two-dimensional combined image representation;
  classifying the received two-dimensional image data as likely to depict a live human person or as likely to depict a two-dimensional spoof of a live human person dependent on results of the analyzing; and
  outputting a classification result indicating a likelihood that the received two-dimensional image data depicts a live human person;
  wherein the creating of the two-dimensional combined image representation comprises:
    subtracting, on a per-pixel basis, the two-dimensional image data representing the first one of the two static images from the two-dimensional image data representing the second one of the two static images to generate two-dimensional image data representing an intermediate image; and
    dividing, on a per-pixel basis, the two-dimensional image data representing the intermediate image by the two-dimensional image data representing the second one of the two static images to create the two-dimensional combined image representation of the received two-dimensional image data.

13. The non-transitory, computer-readable storage medium of claim 12, wherein creating the two-dimensional combined image representation further comprises, prior to said subtracting and said dividing, at least one of: converting the two-dimensional image data representing each of the two static images to respective grayscale images; and downsampling each of the respective grayscale images to a same two-dimensional resolution.

14. The non-transitory, computer-readable storage medium of claim 12, wherein analyzing the two-dimensional combined image representation comprises, prior to determining whether shadowing is detected in the two-dimensional combined image representation, performing a histogram equalization operation on data representing the two-dimensional combined image representation to increase contrast in the two-dimensional combined image representation.

* * * * *